April 22, 1969    J. A. CLARK    3,439,652

FURNACE GRATE CONSTRUCTION

Filed Aug. 7, 1967

JOSEPH A. CLARK
INVENTOR.

BY
AGENT

JOSEPH A. CLARK
INVENTOR.

_United States Patent Office_

3,439,652
Patented Apr. 22, 1969

3,439,652
FURNACE GRATE CONSTRUCTION
Joseph A. Clark, Rte. 1, Box 3642,
Sweethome, Oreg. 97480
Filed Aug. 7, 1967, Ser. No. 658,668
Int. Cl. F23h 3/02
U.S. Cl. 122—374      2 Claims

ABSTRACT OF THE DISCLOSURE

A furnace grate for industrial type furnaces burning solid fuels such as coal, sawdust, wood chips, baggase and the like having a grate comprised of a series of water-cooled pipes with protective metal sleeves loosely mounted on the pipes and capable of movement relative to the pipes. The sleeves are disposed along the pipe members of the grate in an end-to-end manner serving to protect the pipe members of the grate from furnace operating temperatures as well as from slag deposits resulting from fuel impurities.

Background of the invention

Figure 1:
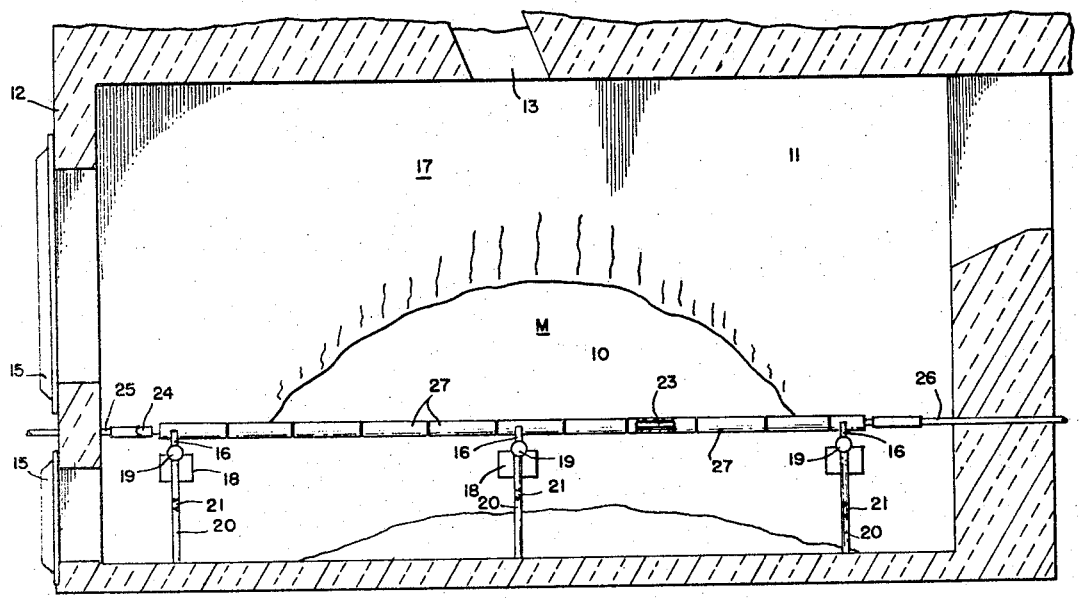

The present invention relates to furnace grates and more particularly to a grate constructed of conduit material through which is circulated a cooling media.

The prior art relating to water cooled furnace grates shows various types having or consisting of parallel runs of interconnected pipe members extending across the firebox of a furnace and for the most part relying upon the cooling flow of water therethrough to protect the grate from the ravages of the high operating temperatures of the furnace. Additional grate art shows plates rotatably mounted on the pipe members of the grate and supporting a fuel pile whereby periodic rocking or tilting of the protective plates may be accomplished to facilitate cleaning thereof. While the above-mentioned plates additionally serve to protect somewhat the grate pipe members from heat and slag from the burning fuel mound they are impractical where waste fuel is burned in view of their requiring periodic cleaning of collected slag and other melted impurities which adhere to any flat surfaces of the plates. Such cleanings obviously require a complete shut-down of the furnace.

Summary

The present invention is embodied in a furnace grate having protective sleeve members disposed over the pipe members of a water cooled grate. The sleeve members are preferably of cast iron metal having sufficient thickness to act as an insulator to protect the water carrying pipe member of the grate from high temperature corrosion and further are advantageous because of their cylindrical configuration to prevent the build-up of slag deposits thereon. In furnaces burning scrap or waste material for fuel considerable slag occurs from the melting of metal or earthen material inadvertently mixed therewith to cause impairment of the required draft through the grate resulting in a rapid reduction in furnace efficiency after each cleaning.

The protective sleeves allow the rate of water flow through the pipe members of the grate to be reduced approximately by one-half effecting a sizable economy, both financially and of a natural resource, over an extended period.

A further advantage of the present grate construction results from the insulating characteristics of the cylindrical sleeves which permits full operation of the furnace regardless of periodic interruptions or changes in volume of the water flow without the risk of burning out of the pipe members as would occur in an exposed grate constructed of pipe members.

An additional advantage of the sleeve members is realized by reason of their heat retaining characteristics to better support fuel combustion than would an exposed water carrying segment of the pipe grate with the result that all of the fuel in a mound on the grate will be efficiently burned.

The metal sleeves by reason of being loosely mounted on their supporting pipe members function as insulators and further may be conveniently interchanged with sleeves of larger or smaller diameters to conveniently effect a change in the lateral spacing or openings in the grate. Such openings or lateral distances between said insulator sleeves being limited of course by the requirement of being capable of supporting the types of mounded fuel above noted. Such a change permits the furnace grate to be readily adapted to provide the most efficient draft for burning of several different types of fuel.

A further advantage derived from the cylindrical metal sleeves results from the increased efficiency of a furnace so equipped. Over an extended period the round surfaces of the sleeve prevent any slag build-ups on the grate which would impair the draft therethrough. Consequently the grate members may be set at an optimum distance apart with no added spacing being required to compensate for such a slag build-up and reduced air flow. Accordingly, thermal efficiency of a furnace modified with the present grate is such that the grate area may be reduced by as much as a twenty-five percent from the previous grate installation without a reduction in furnace output.

The sleeves being movable relative to the conduit members of the grate allow the sleeves to be rotated about their axes after long periods of rise to locate an unused segment of their cylindrical surface in a fuel receiving position.

These and other advantages will become subsequently apparent in the following specification and drawings referred to therein.

Drawing description

Figure 2:
Figure 3:
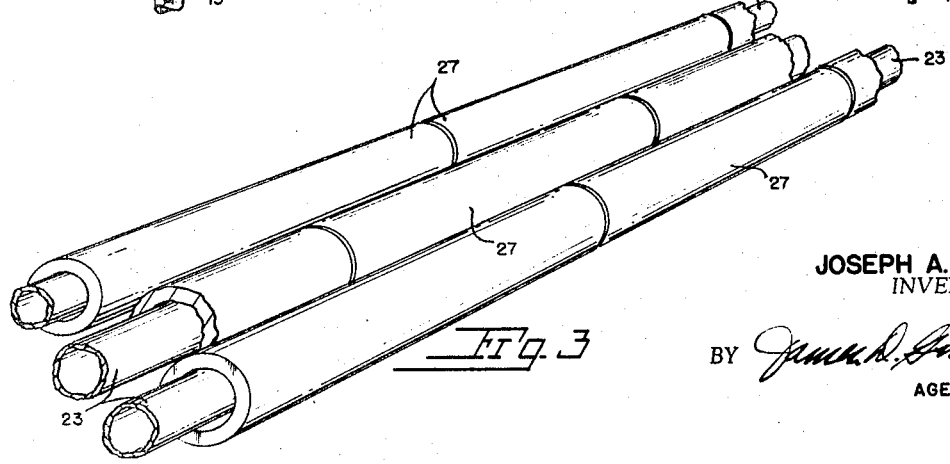
Figure 4:
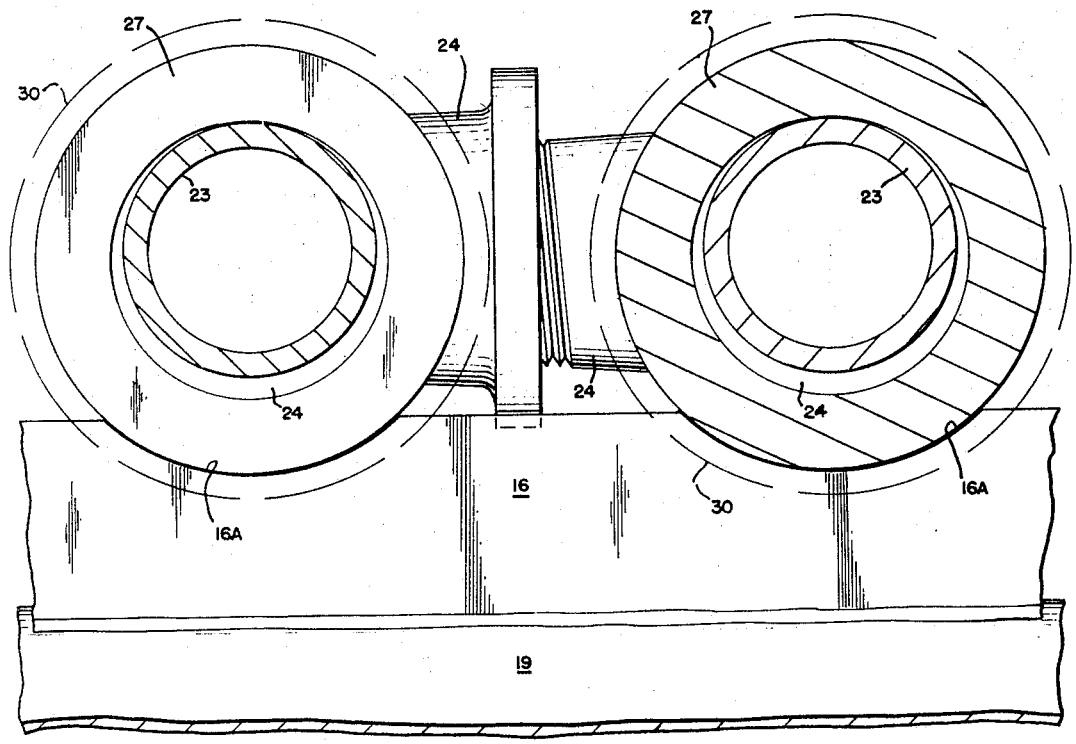

FIGURE 1 is a side elevational view of a typical industrial furnace provided with a grate embodying the present invention, FIGURE 2 is a plan view of a section of the furnace grate shown in FIGURE 1, FIGURE 3 is a perspective view of a section of the grate including adjacent pipe members and sleeves mounted thereon, and FIGURE 4 is a sectional view taken along line 4—4 of FIGURE 2 showing the preferred relationship of the sleeves to their supporting pipe members.

Description of preferred embodiment

With continuing reference to the drawings wherein like reference numerals identify like parts, the reference numerals identify like parts, the reference numeral 10 indicates generally a grate embodying the present invention within the firebox 11 of an industrial furnace 12 of the type burning solid fuel supplied as through a fuel chute as at 13. An ash pit is indicated at 14 with access thereto and to the firebox being had through a pair of doors 15 in the usual manner.

While the present invention is shown in place within a "Dutch oven" type furnace it will be understood that its use is not limited to any specific type of furnace configuration.

The furnace grate 10 is supported in a substantially level manner by saddles 16 which may extend intermediate the brick walls 17 of the furnace. The saddles 16 comprise stringers having spaced apart cut out portions 16A (FIG. 4) to receive grate components as later described and are preferably welded along their lengths to supporting, coextensive pipes 19, as shown, which rest in supports 18. The pipes may alternatively terminate in spaced relationship from the firebox walls and be supported by water cooled standards.

In communication adjacent both ends of each stringer supporting pipe 19 are supply and return headers 20–21 for circulation of a flow of water therethrough cooling same indirectly the saddle 16 mounted thereon.

Occupying substantially the width of the firebox 11 is the present grate structure comprising a series of parallel, horizontally spaced apart pipe members or conduits 23, each fluid communication with its adjacent pipe members. For the sake of convenience as well as economy it has been found entirely practical to utilize pairs of standard, ninety degree pipe elbows 24 each in threaded attachment with their supporting pipe members 23 and at their common ends as shown in FIGURE 4. The pipe elbows 24 are internally threaded for attachment to the pipe members 23 with one elbow of each pair being a sheet elbow having a reduced end for insertion wtihin the other elbow. Accordingly, each pipe member 23 in the series is in fluid communication with the other pipe members for the passage therethrough of a cooling flow of water provided by inlet and outlet conduits indicated at 25 and 26.

In combination with the pipe members are insulators in the form of sleeve members 27 of hollow cylindrical shape located therealong in end-to-end fashion to fully conceal its supporting pipe member 23 except for the end spacing necessary to allow for longitudinal expansion of the sleeve members upon heating. An inch or so of spacing of the outermost sleeve from the elbow connection has been determined adequate for such expansion in a typical furnace installation. The sleeves are preferably arranged along adjacent pipe members in a staggered fashion as shown and laterally spaced in a close manner to support the particulated fuels above mentioned i.e., coal, sawdust, wood chips, baggase. Such spacing is necessarily less than the outer diameter of an insulator as clearly shown in the enlarged sectional detail view of FIGURE 4.

Each sleeve or insulator is preferably of a cast iron alloy capable of withstanding maximum temperatures of approximately 1500 degrees Fahrenheit produced by such furnaces over long durations without incurring any physical damage. Since, as shown in FIGURE 4, the sleeves 27 have a larger inner diameter than the outside diameter of their supporting pipe members 23 the sleeve is in effect suspended therefrom and only in line contact with the former. It will be apparent that the sleeve member for the most part does not partake of the cooling effect of the water flow through the pipe member but instead is heated by the burning fuel mound at M to a substantially higher and more efficient fuel burning temperature.

As shown in dashed lines in FIGURE 4 the lateral spacing between sleeve members and hence the draft may be conveniently varied by simply substituting sleeves of different diameters as at 30. With continuing attention to FIGURE 4 the lateral spacing between sleeves 27 is less than a diameter of one of said sleeves such being necessary to support the particulated fuel mounds without requiring the presence of flat slag collecting surfaces.

While not limiting the present invention in any way a successful embodiment of the gate provides sleeves having a wall thickness of approximately three-eighths inch and an inner diameter of one and three-eighths inches when used in conjunction with pipe members having an outer diameter of one and one-quarter inches.

The grate may be fabricated in circular plan configuration for installation in round cell type boilers commonly used in industries processing sugar canes for the burning of cane waste material known as bagasse without departing from the scope of the present invention.

While I have shown and described a single embodiment of the present invention it will be understood that the minor variations therein will be readily apparent to others skilled in the art, such variations coming within the spirit and scope of the present invention as limited only by the appended claims.

I claim:

1. A furnace grate comprising a series of laterally spaced interconnected water cooled conduit members, a plurality of independent insulators loosely disposed along each of said conduit members, said insulators being of hollow cylindrical shape and laterally spaced a distance less than the outer diameter of an insulator to support a fuel mound deposited thereon and defining a longitudinally extending bore therethrough, said bore being of substantially greater diameter than the outer diameter of the conduit member to provide an air space therebetween whereby said conduit member is insulated from furnace temperatures and whereby said cylindrical shape will prevent accumulation of slag deposits.

2. The invention as claimed in claim 1 wherein said water cooled conduits are supported by stringers mounted upon water cooled pipe members.

References Cited

UNITED STATES PATENTS

| 834,932 | 11/1906 | Parkison | 122—374 X |
| 951,345 | 3/1910 | Spangelo et al. | 122—374 |
| 1,637,216 | 7/1927 | Cunningham et al. | 122—374 |
| 1,852,492 | 4/1932 | Tawlks | 122—374 |

CHARLES J. MYHRE, *Primary Examiner.*